US012027328B2

(12) United States Patent
Ku et al.

(10) Patent No.: US 12,027,328 B2
(45) Date of Patent: Jul. 2, 2024

(54) SWITCH CONTROL DEVICE

(71) Applicants: CANDY HOUSE INC., Taichung (TW); CANDY HOUSE INC., Palo Alto, CA (US)

(72) Inventors: Che-Ming Ku, Taipei (TW); Wen Hang Su, Palo Alto, CA (US)

(73) Assignees: CANDY HOUSE INC., Taichung (TW); CANDY HOUSE INC., Palo Alto, CA (US)

(*) Notice: Subject to any disclaimer, the term of this patent is extended or adjusted under 35 U.S.C. 154(b) by 358 days.

(21) Appl. No.: 17/457,850

(22) Filed: Dec. 6, 2021

(65) Prior Publication Data

US 2022/0181094 A1 Jun. 9, 2022

(30) Foreign Application Priority Data

Dec. 8, 2020 (TW) ................................ 109143184

(51) Int. Cl.

*H01H 3/26* (2006.01)
*H01H 9/02* (2006.01)
*H01H 9/06* (2006.01)
*H01H 13/20* (2006.01)

(52) U.S. Cl.

CPC ................ *H01H 3/26* (2013.01); *H01H 9/02* (2013.01); *H01H 13/20* (2013.01); *H01H 2009/066* (2013.01)

(58) Field of Classification Search

CPC ........... H01H 3/26; H01H 9/02; H01H 13/20; H01H 2009/066; H01H 13/14; H01H 23/145; H01H 23/148

See application file for complete search history.

(56) References Cited

U.S. PATENT DOCUMENTS

| | | | | |
|---|---|---|---|---|
| 5,719,362 A * | 2/1998 | Gray, Jr. | .................. | H01H 3/26 200/38 R |
| 5,955,796 A * | 9/1999 | Nilssen | .................. | G04G 15/00 200/38 B |
| 2005/0194243 A1 | 9/2005 | Prineppi | | |

FOREIGN PATENT DOCUMENTS

| | | |
|---|---|---|
| CN | 109449019 A | 3/2019 |
| JP | 2009-43664 A | 2/2009 |
| WO | 2014/082674 A1 | 6/2014 |

OTHER PUBLICATIONS

Search Report appended to an Office Action, which was issued to Taiwanese counterpart application No. 109143184 by the TIPO on May 27, 2021, with an English translation thereof (2 pages).

* cited by examiner

*Primary Examiner* — Edwin A. Leon
(74) *Attorney, Agent, or Firm* — HSML P.C.

(57) ABSTRACT

A switch control device includes a casing, a motor, a control unit, and a push arm. The casing includes a mounting wall adapted to be mounted on a mounting surface, and a surrounding wall extending transversely from the mounting wall. The motor is disposed in the casing and has a rotary shaft extending through the surrounding wall. The control unit is connected to the motor. The push arm is disposed outside of the surrounding wall and is coupled to the rotary shaft so as to be driven to rotate relative to the casing without touching the casing, between a pushing state and a release state, thereby controlling the switch.

12 Claims, 11 Drawing Sheets

SWITCH CONTROL DEVICE

CROSS-REFERENCE TO RELATED APPLICATION

This application claims priority of Taiwanese Patent Application No. 109143184, filed on Dec. 8, 2020.

FIELD

The disclosure relates to a switch control device, and more particularly to a switch control device that is remotely operable.

BACKGROUND

A conventional switch control device is mounted on a mounting surface such as a wall surface of a building for controlling a switch that is disposed on the mounting surface.

FIG. 10 shows a conventional switch control device disclosed in Chinese Patent Application Publication No. 109449019A. The conventional switch control device includes a base wall 82, an actuation unit 81, and a push member 83. The base wall 82 has inner and outer sides 821, 822 and is formed with a through hole 823 extending through the inner and outer sides 821, 822. The actuation unit 81 includes an electric actuator 811 disposed on the outer side 822 of the base wall 82, an actuation arm 812, and a connecting member 815. The actuation arm 812 has a coupling end coupled to the electric actuator 811, and a free end disposed above the through hole 823 of the base wall 82, such that the actuation arm 812 can be driven by the electric actuator 811 to pivot. During the pivoting movement of the actuation arm 812, the free end of the actuation arm 812 moves toward or away from the base wall 82. The connecting member 815 is disposed to extend through the through hole 823, and has an end that is coupled to the free end of the actuation arm 812. The push member 83 is coupled to another end of the connecting member 815. In use, the conventional switch control device is mounted on a mounting surface in a manner that the inner side 821 of the base wall 82 faces and is spaced apart from the mounting surface, and that the push member 83 is registered with a switch button that is disposed on the mounting surface. When the electric actuator 811 is activated, the actuation arm 812 is driven by the electric actuator 811 to push the connecting member 815, so that the push member 83 moves toward and abuts against the switch button, thereby controlling the switch button. However, according to such configuration, since the push member 83 is only capable of pushing one place, the conventional switch control device may not be suitable for various types of switches. For example, since it is necessary for tumbler switches and toggle switches to be pushed toward two different directions or to be pushed at two different positions thereon for controlling on and off, the conventional switch control device is not suitable for such switches.

As shown in FIG. 11, another type of a conventional switch control device includes a casing 901 formed with a slot 902, an actuator (not shown) disposed in the casing 901, and a push arm 903 disposed in the casing 901. The actuation of the actuator drives the push arm 903 to pivot, so that the push arm 903 is capable of moving between a retract state, where a distal end of the push arm 903 is disposed in the casing 901, and an advance state, where the distal end of the push arm 903 is flipped out of the casing 901 via the slot 902. In use, this type of conventional switch control device is mounted on a mounting surface 9A and is juxtaposed to a switch button 9B disposed on the mounting surface 9A. When the push arm 903 is activated by the actuator, the push arm 903 moves to the advance state to thereby push the switch button 9B using the distal end of the push arm 903. However, since the length of the slot 902 has to be larger than the length of the push arm 903 in order to permit the movement of the push arm 903 between the retract state and the advance state, the range outside of the casing 901 that the push arm 903 can reach is limited to the length of the slot 902. In addition, the push arm 903 is only capable of pushing one place outside of the casing 901.

SUMMARY

Therefore, an object of the disclosure is to provide a switch control device that can alleviate the drawback of the abovementioned prior art.

According to an aspect of the disclosure, the switch control device is adapted for controlling a switch that is disposed on a mounting surface. The switch control device includes a casing, a motor, a control unit, and a push arm. The casing includes a first mounting wall that is adapted to be mounted on the mounting surface, and a surrounding wall that extends transversely from a periphery of the first mounting wall. The motor is disposed in the casing, and has a rotary shaft that extends transversely through the surrounding wall. The control unit is disposed in the casing, and is electrically connected to the motor for controlling operation of the motor. The push arm is disposed outside of the surrounding wall, and is coupled to the rotary shaft of the motor such that rotation of the rotary shaft drives the push arm to rotate relative to the casing, without touching the casing, between a pushing state, where the push arm is adapted to push the switch, and a release state, where the push arm is adapted to be separated from the switch, thereby controlling the switch.

According to another aspect of the disclosure, the switch control device is adapted for controlling a switch that is disposed on a mounting surface. The switch control device includes a casing, a motor, and a push arm. The casing includes opposite first and second mounting walls, and a surrounding wall. One of the first and second mounting walls is adapted to be mounted on the mounting surface so as to secure the casing on the mounting surface. The surrounding wall extends transversely from the first mounting wall and is connected transversely to the second mounting wall. The surrounding wall has two first wall parts that are opposite to each other, and two second wall parts that are arranged alternately with the first wall parts. The motor is disposed in the casing, and has a rotary shaft that extends transversely through one of the second wall parts of the surrounding wall. The push arm is disposed outside of the surrounding wall, and has a coupling end that is coupled to the rotary shaft of the motor, and a distal end that is opposite to the coupling end, such that rotation of the rotary shaft drives the push arm to rotate relative to the casing for pushing the switch without touching the casing. A distance between one of the first wall parts and an intersection of the rotary shaft and the coupling end of the push arm is different from a distance between the other one of the first wall parts and the intersection of the rotary shaft and the coupling end of the push arm.

According to still another aspect of the disclosure, the switch control device is adapted for controlling a switch that is disposed on a mounting surface. The switch control device includes a casing, a motor, and a push arm. The casing includes a first mounting wall that is adapted to be mounted on the mounting surface, and a surrounding wall that extends transversely from a periphery of the first mounting wall. The motor is disposed in the casing, and has a rotary shaft that extends transversely through one of the second wall parts of the surrounding wall. The push arm is disposed outside of the surrounding wall, and has a coupling end that is coupled to the rotary shaft of the motor, and a distal end that is opposite to the coupling end, such that rotation of the rotary shaft drives the push arm to rotate relative to the casing for pushing the switch without touching the casing. An intersection of the rotary shaft and the coupling end of the push arm is adjacent to a corner of the casing where the first mounting wall is connected to the surrounding wall.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
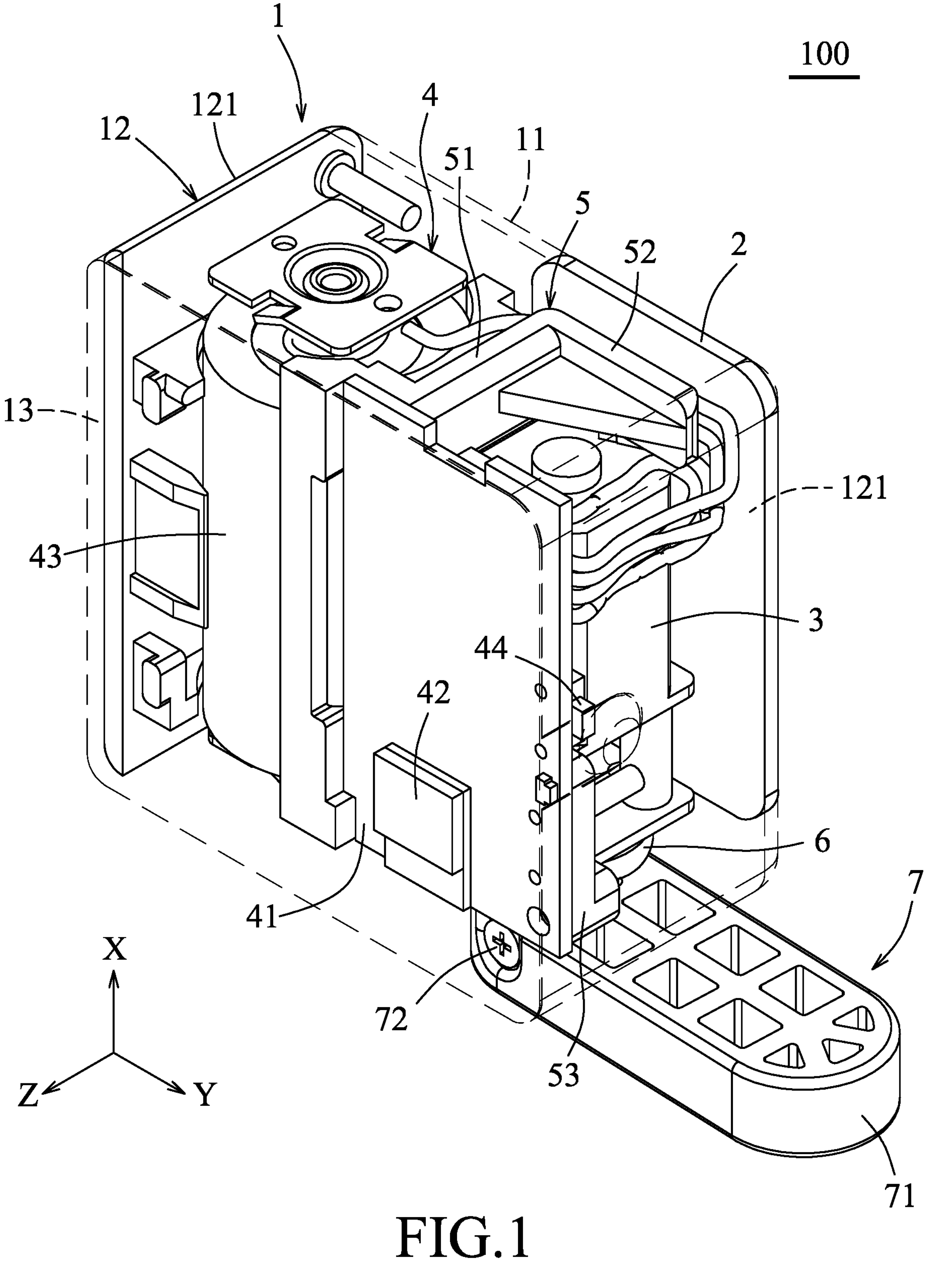
FIG. 1 is a perspective view illustrating an embodiment of a switch control device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4:
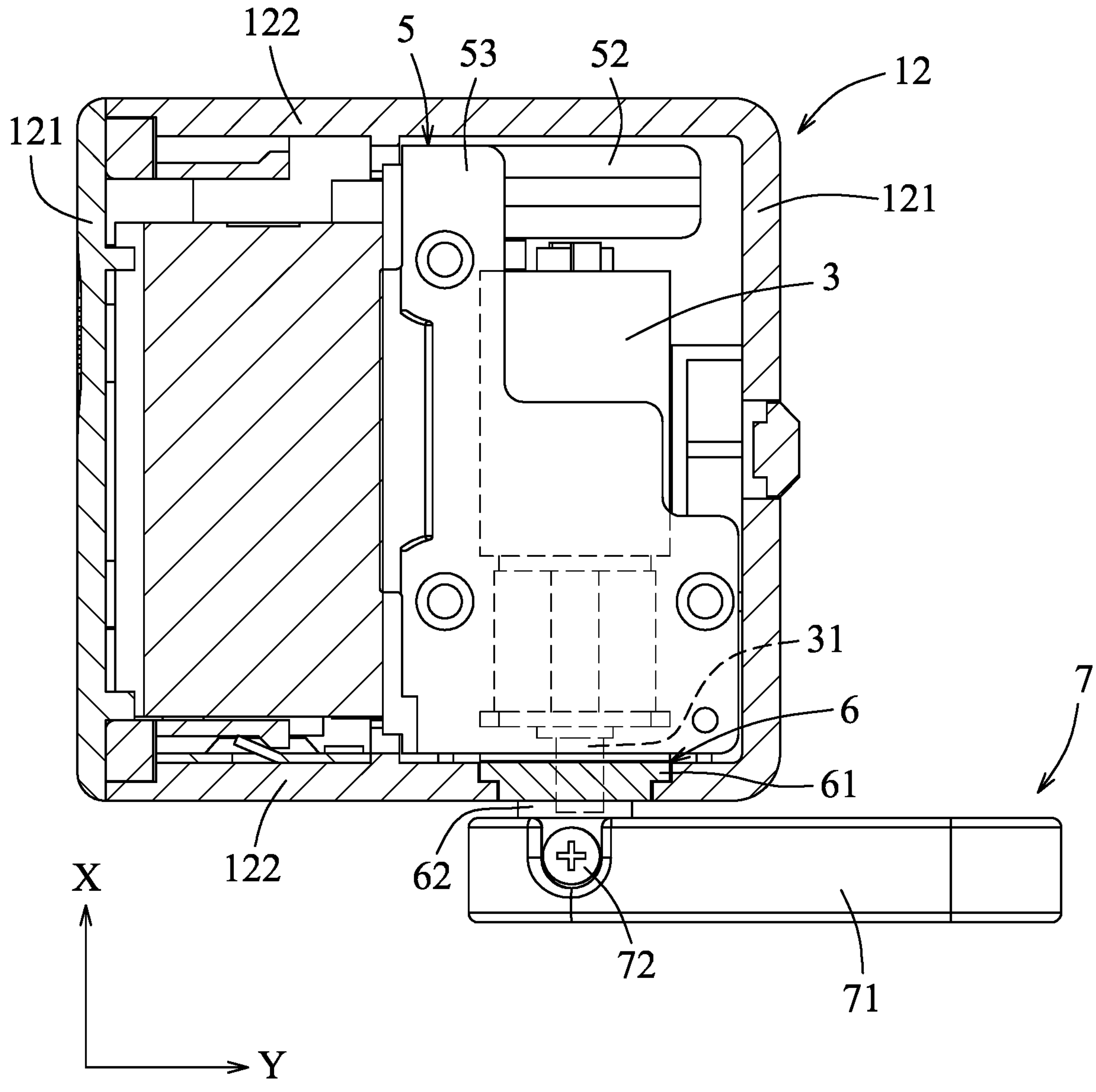
FIG. 4 is a partly sectional view illustrating the embodiment.
Figure 5:
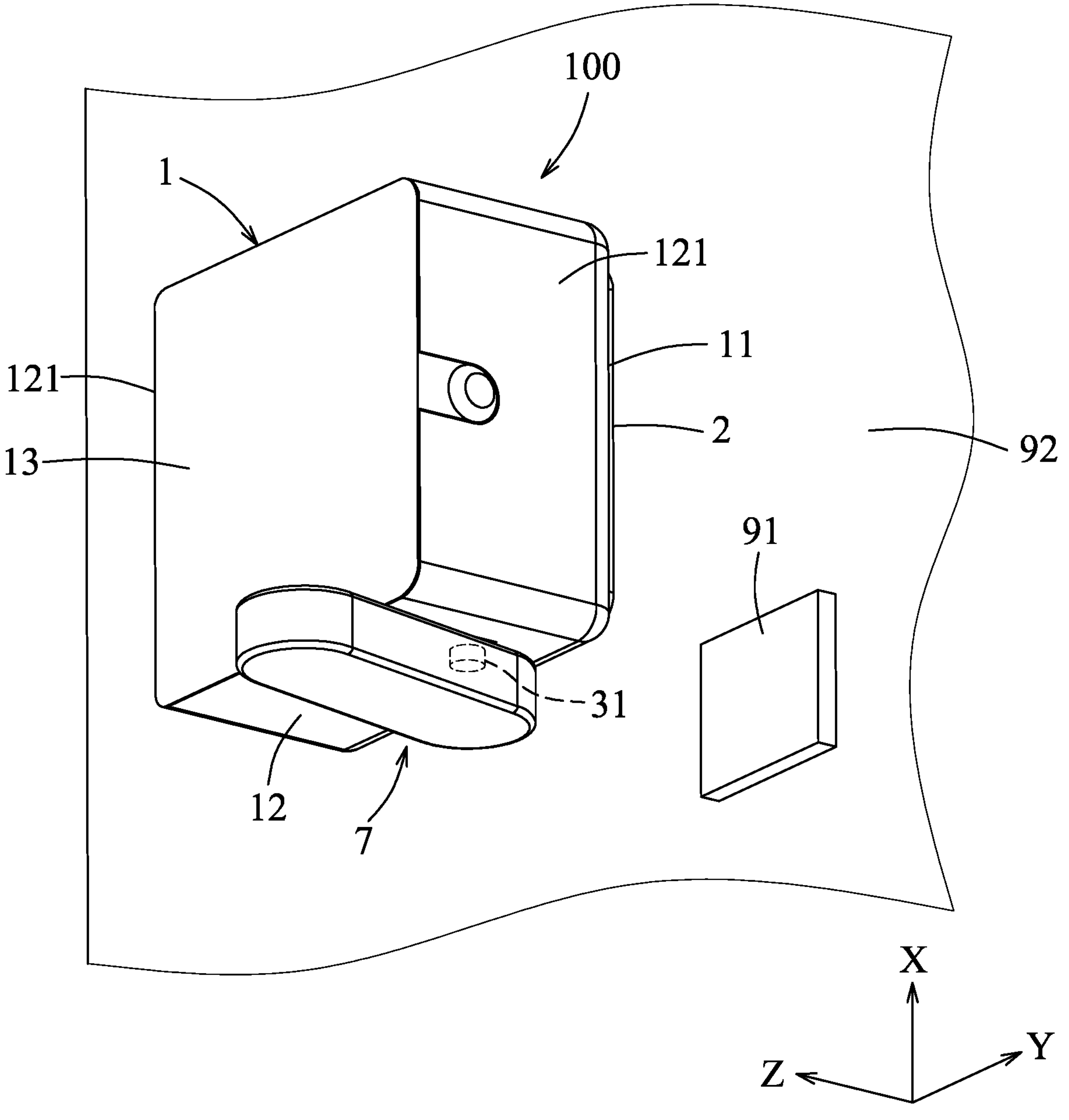
FIG. 5 is a perspective view illustrating the embodiment, in which a push arm thereof is in a release state.

Referring to FIGS. 1 to 7, a switch control device 100 according to an embodiment of the present invention is adapted to be disposed on a mounting surface 92 for controlling a switch 91 that is disposed on the mounting surface 92 upon receiving a wireless control signal transmitted from an external device (not shown). As shown in FIG. 5, in this embodiment, the mounting surface 92 is, for example, a wall surface, and the switch 91 is exemplified as a push button. However, the switch 91 may be various types of switches that are installed on the mounting surface 92, such as a button switch, a toggle switch, and a rocker switch. The external device may be a remote control device including an infrared remote controller or a communication device such as a smartphone or a tablet computer that is capable of outputting a control signal via Bluetooth® or other wireless technology.

Figure 2:
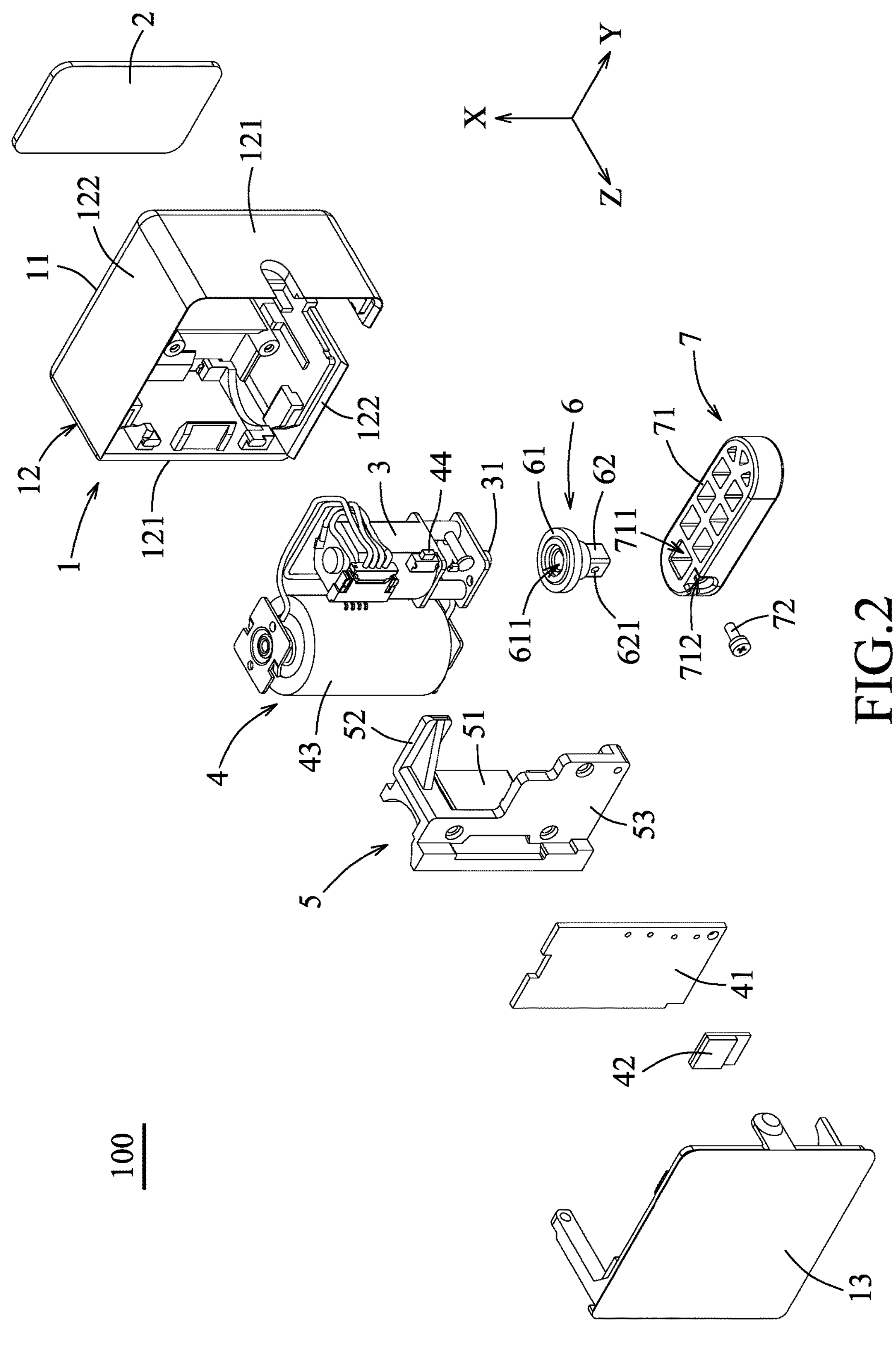
FIG. 2 is an exploded perspective view illustrating the embodiment.
Figure 3:
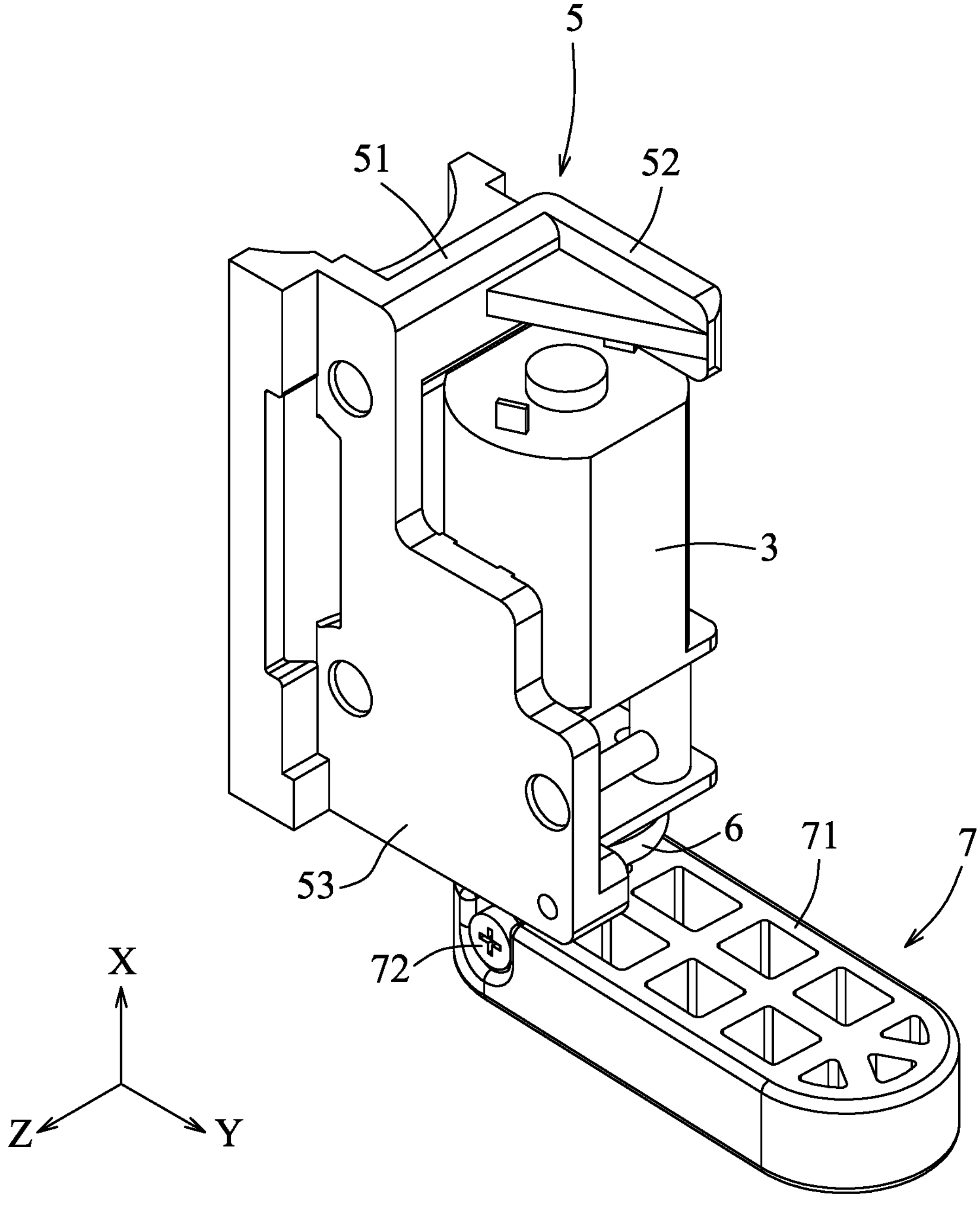
FIG. 3 is a perspective view illustrating the embodiment with some components being omitted.

Referring to FIGS. 1, 2 and 5, the switch control device 100 includes a casing 1, a mounting member 2, a motor 3, a control unit 4, a motor mounting base 5, a coupling member 6, and a push arm 7.

Referring to FIGS. 2, 4 and 5, the casing 1 includes a first mounting wall 11, a second mounting wall 13 that is opposite to the first mounting wall 11, and a surround wall 12 extending transversely from a periphery of the first mounting wall 11 and connected transversely to a periphery of the second mounting wall 13. In this embodiment, the surrounding wall 12 is configured to have a rectangular column shape having two first wall parts 121 that are opposite to each other, and two second wall parts 122 that are arranged alternately with the first wall parts 121. Specifically, the two second wall parts 122 are opposite to each other in a first direction (X), the two first wall parts 121 are opposite to each other in a second direction (Y).

The mounting member 2 is provided on one of first and second mounting walls 11, 13 for mounting the one of the first and second mounting walls 11, 13 on the mounting surface 92 so as to secure the casing 1 on the mounting surface 92. In this embodiment, the mounting member 2 is configured as an adhesive tape and is provided on the first mounting wall 11 for securing the first mounting wall 11 to the mounting surface 92. As shown in FIG. 5, the surrounding wall 12 extends from the first mounting wall 11 to the second mounting wall 13 in a third direction (Z) that is perpendicular to both of the first and the second directions (X), (Y). In other embodiments, the mounting member 2 may be configured as a hook or a suction cup, and the types of the mounting member 2 may be selected according to actual need.

Referring to FIGS. 1 to 4, the motor 3 is disposed in the casing 1, and has a rotary shaft 31 that extends transversely through the surrounding wall 12.

The control unit 4 is disposed in the casing 1, and includes a control module 41, a wireless communication module 42, a power supply module 43, and a control switch 44.

The control module 41 is electrically connected to the motor 3 for controlling operation of the motor 3. Specifically, the control module 41 has a circuit board and a control chip (not shown) mounted on the circuit board.

The wireless communication module 42 is electrically connected to the control module 41, and is configured to output a control signal to the control module 41 upon receiving a wireless control signal from the external device via a wireless network such as, but not limited to, infrared communication, Wi-Fi, and Bluetooth®. The control module 41 controls operation of the motor 3 according to the control signal received from the wireless communication module 42.

The power supply module 43 is electrically connected to the control module 41 for supplying electrical power to the motor 3 via the control module 41. The power supply module 43 may be implemented as a battery, a power converter, or other appropriate device to match a particular application.

The control switch 44 is electrically connected to the control module 41 and is operable for outputting a control signal to the control module 41. The control module 41 is further configured to control operation of the motor 3 according to the control signal received from the control switch 44. The control switch 44 may be configured as, but not limited to, a push button or a touch switch that outputs the control signal upon being operated.

Referring to FIGS. 1 to 4, the motor mounting base includes a base wall 51, and first and second positioning walls 52, 53. The base wall 51 extends transversely from an inner surface of the first mounting wall 11. The first and second positioning walls 52, 53 extend transversely from the base wall 51, are parallel to each other, are disposed respectively at opposite sides of the motor 3, and abut against the motor 3, thereby preventing the motor 3 from moving along the base wall 51. In addition, the first and second positioning walls 52, 53 can be used as guide walls for guiding wires connected between the motor 3 and the control unit 4, thereby preventing displacement of the wires that may be caused by vibration of the motor 3.

The push arm 7 is disposed outside of the surrounding wall 12 and coupled to the rotary shaft 31 of the motor 3 such that rotation of the rotary shaft 31 drives the push arm 7 to rotate relative to the casing 1, without touching the casing 1, between a pushing state, where the push arm 7 is adapted to push the switch 91, and a release state, where the push arm 7 is adapted to be separated from the switch 91, thereby controlling the switch 91. The push arm 7 is bidirectionally rotatable in a 360 degree angle when the switch control device 100 is not mounted on the mounting surface 92.

In this embodiment, the push arm 7 is coupled to the rotary shaft 31 of the motor 3 via the coupling member 6. Specifically, as shown in FIG. 2, the push arm 7 includes a securing member 72, and an arm body 71 having a coupling end that is coupled to the rotary shaft 31 of the motor 3, and a distal end that is opposite to the coupling end. The coupling end of the arm body 71 is formed with first and second engaging holes 711, 712 that are communicated with each other and that are transverse to each other.

The coupling member 6 includes a base portion 61 that is formed with a third engaging hole 611, and a protruding portion 62 that protrudes from the base portion 61, that is inserted into the first engaging hole 711 of the arm body 71, and that is formed with a fourth engaging hole 621 being registered with the second engaging hole 712 of the arm body 71. The rotary shaft 31 of the motor 3 engages with the third engaging hole 611 of the base portion 61 of the coupling member 6, and the securing member 72 of the push arm 7 is inserted into the second engaging hole 712 and engages with the fourth engaging hole 621 of the protruding portion 62 of the coupling member 6, thereby detachably coupling the push arm 7 to the rotary shaft 31 of the motor 3.

In this embodiment, the securing member 72 is configured as a bolt, and the fourth engaging hole 621 of the protruding portion 62 of the coupling member 6 is configured as a threaded hole. The arm body 71 is configured as a straight stick, and extends beyond the casing 1 when viewing along the first direction (X).

Besides, as shown in FIG. 4, the rotary shaft 31 of the motor 3 extends along the first direction (X) through one of the second wall parts 122, and a distance between one of the first wall parts 121 and an intersection of the rotary shaft 31 and the coupling end of the push arm 7 is different from a distance between the other one of the first wall parts 121 and the intersection of the rotary shaft 31 and the coupling end of the push arm 7 (i.e., the position where the rotary shaft 31 extends through the one of the second wall parts 122 is not right in the middle of the one of the second wall parts 122).

It should be noted that, the configuration of the push arm 7 is not limited to the present embodiment and various modifications can be made. For example, the arm body 71 of the push arm 7 may be configured to have an L-shape or other bent shape in other embodiments for applying to various types of switches. Moreover, the position where the rotary shaft 31 extends through the one of the second wall parts 122 may be located right in the middle of the one of the second wall parts 122 between the first wall parts 121 in other embodiments. Furthermore, when the switch control device 100 is used for controlling a rotary switch having a gear, the arm body 71 of the push arm 7 may be further configured to have a gear that meshes with a gear of the switch 91 for rotating the switch 91.

It should be further noted that, the coupling member 6 is omittable in other embodiments of the present disclosure. In such embodiments, the rotary shaft 31 of the motor 3 may be inserted directly into the first engaging hole 711 of the arm body 71 of the push arm 7.

Figure 6:
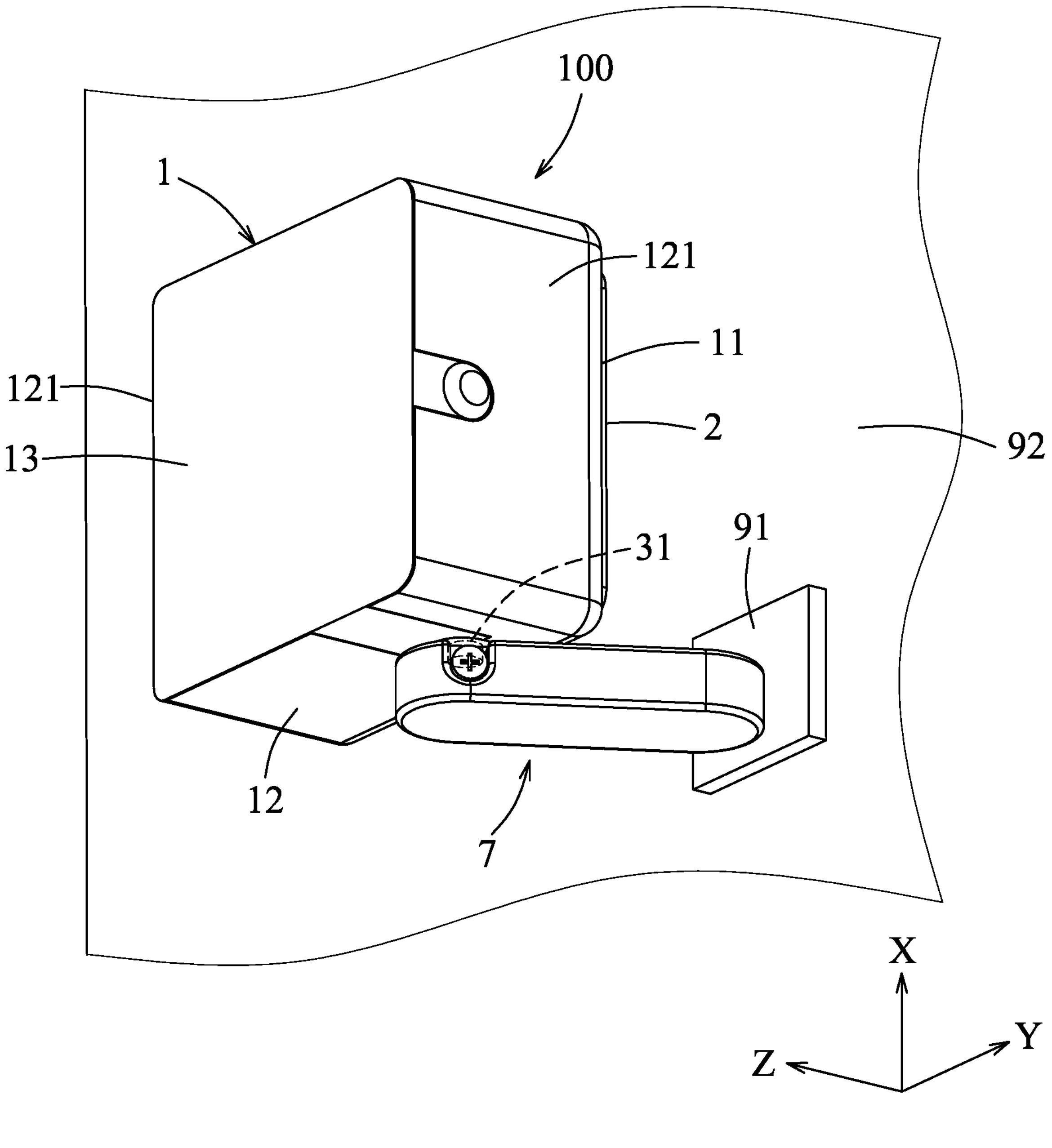
FIG. 6 is a view similar to FIG. 5 but showing that the push arm is in a pushing state.

Referring to FIGS. 2, 5, and 6, in use, the first mounting wall 11 may be mounted on the mounting surface 92 via the mounting member 2 in a manner that the switch control device 100 is disposed at a side of the switch 91, and that the switch 91 is reachable to the push arm 7 as a result of the rotation of the push arm 7. When a user of the switch control device 100 wants to rotate the push arm 7, the user may use the remote control device to output a control signal to the wireless communication module 42, for allowing the control module 41 to activate the motor 3, thereby rotating the push arm 7 between the release state and the pushing state. The user also may use the control switch 44 to manually activate the motor 3 to rotate the push arm 7.

As shown in FIG. 5, when in the release state, the push arm 7 extends in the third direction (Z) (i.e., the push arm 7 is transverse to the mounting surface 92), away from the first mounting wall 11, and beyond the second mounting wall 13, so that a distance between the distal end of the arm body 71 and the first mounting wall 11 is larger than a distance between the distal end of the arm body 71 and the second mounting wall 13.

As shown in FIG. 6, when in the pushing state, the push arm 7 extends away from the second mounting wall 13, and beyond one of the first wall parts 121 of the surrounding wall 12, and the distal end of the arm body 71 of the push arm 7 is adjacent to the mounting surface 92 and pushes the switch 91.

It should be noted that, in other embodiments, the arm body 71 of the push arm 7 may not belong enough to extend beyond the one of the first wall parts 121 of the surrounding wall 12 while in the pushing state, but can still function as long as the casing 1 is positioned at an appropriate position on the mounting surface 92 where the distal end of the arm body 71 can push the switch 91.

Figure 7:
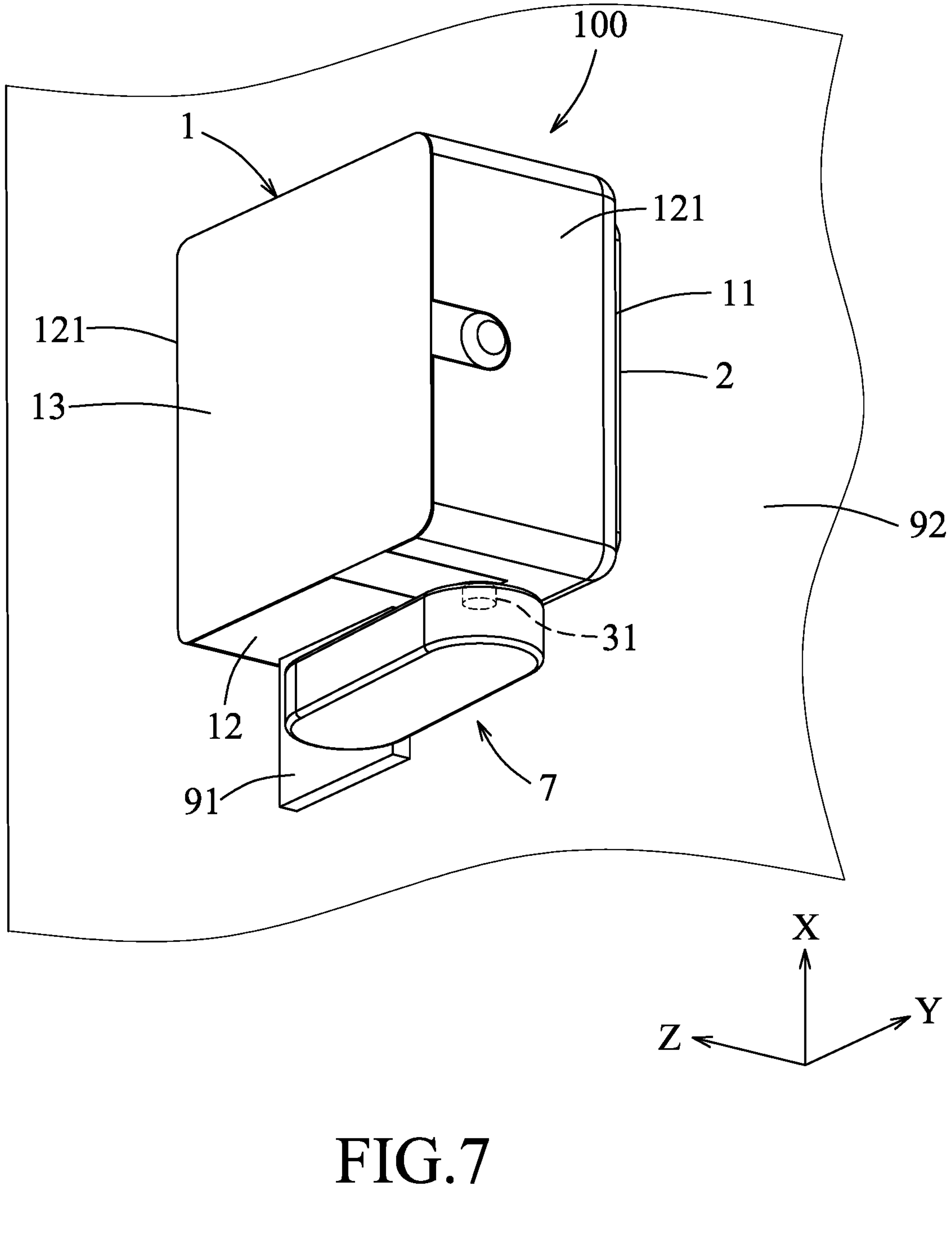
FIG. 7 is a view similar to FIG. 5 but showing that the push arm is in another pushing state.

As shown in FIG. 7, in use, the switch control device 100 can also be disposed at another side of the switch 91 unlike the example shown in FIGS. 5 and 6, since the push arm 7 is disposed outside of the surrounding wall 12 and is capable of rotating bidirectionally without touching the casing 1.

Besides, the switch control device 100 of the present embodiment can also be mounted between two switches (not shown) disposed on the mounting surface 92 for controlling both of the switches, since the push arm 7 is able to rotate to opposite directions to push the switches alternately.

Figure 8:
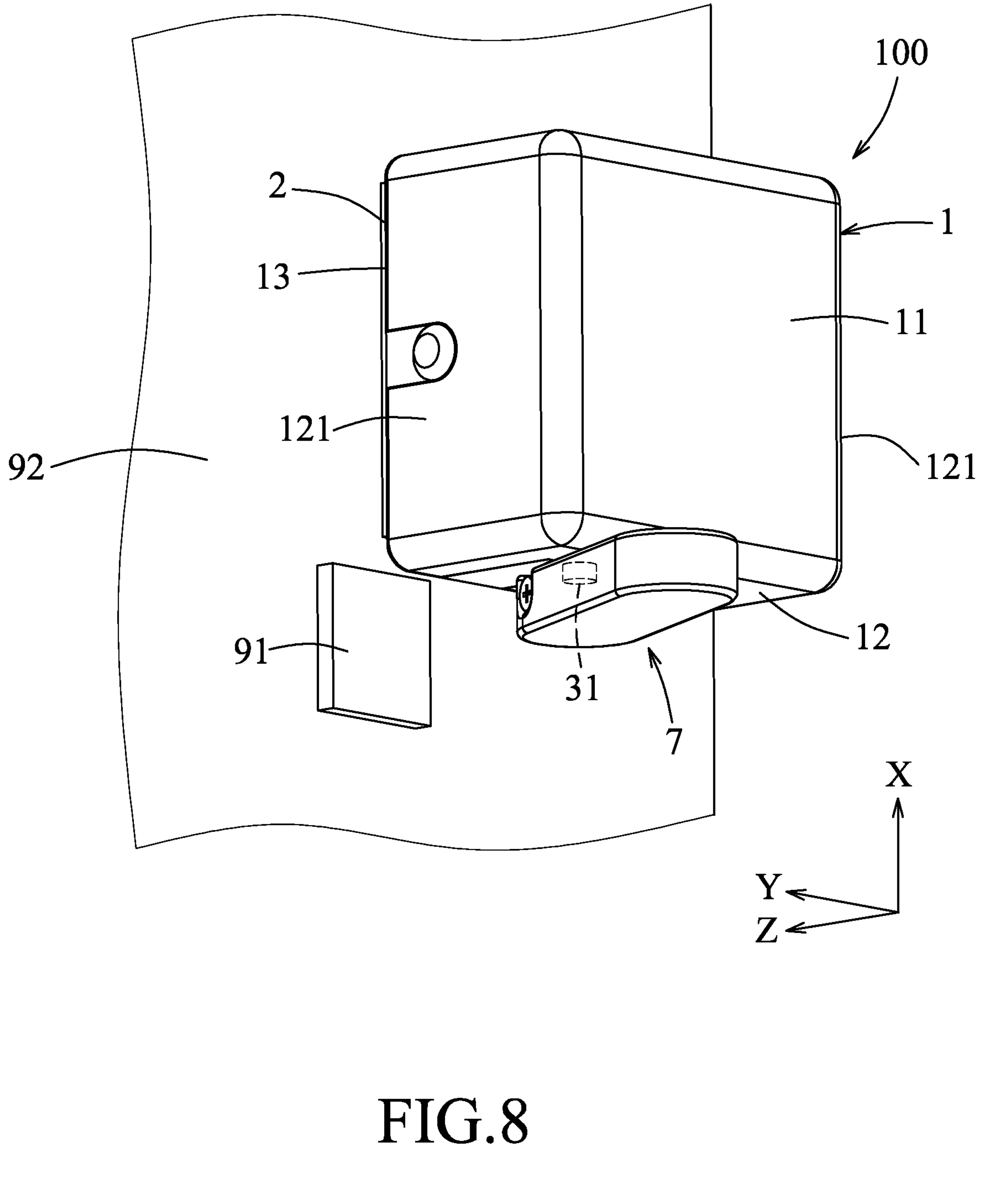
FIG. 8 is a perspective view illustrating another embodiment of the switch control device, in which the push arm is in the release state.
Figure 9:
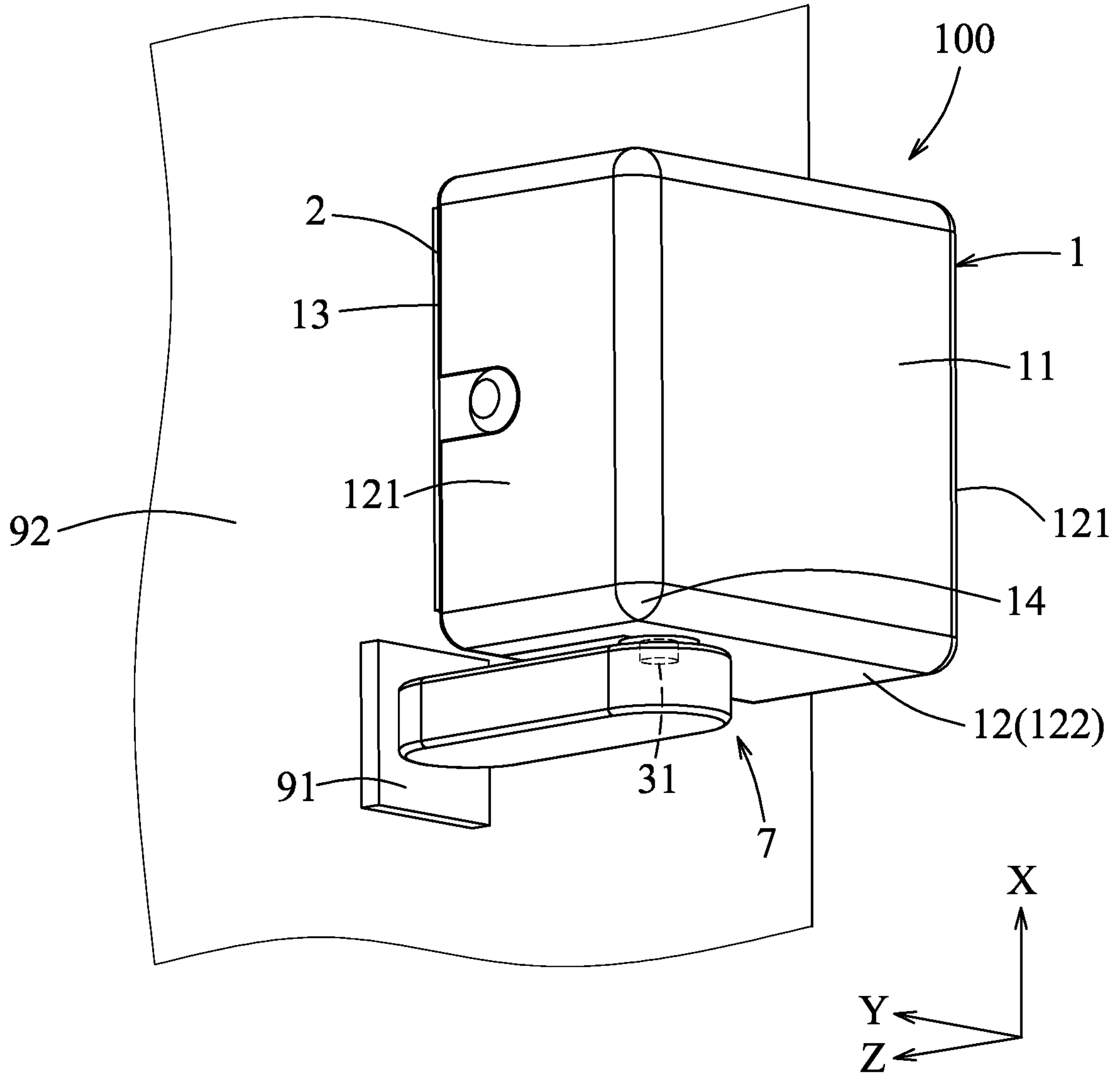
FIG. 9 is a view similar to FIG. 8 but showing that the push arm is in yet another pushing state.
Figure 10:
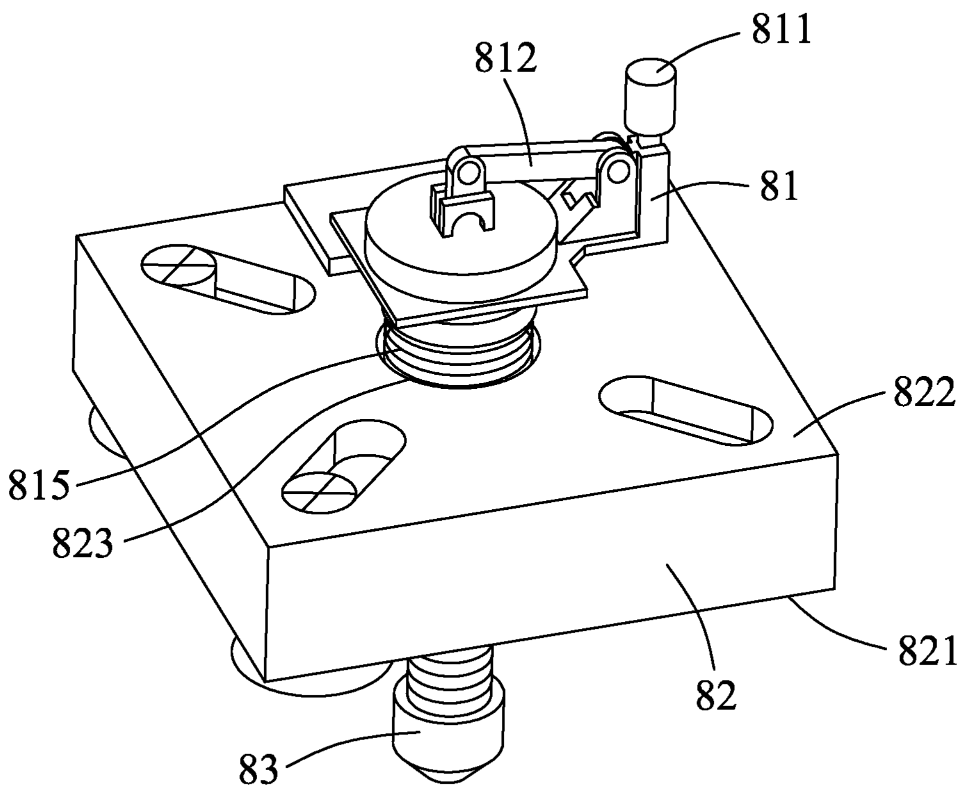
FIG.10 PRIOR ART
FIG. 10 is a perspective view illustrating a conventional switch control device disclosed in Chinese Patent Application Publication No. 109449019A.
Figure 11:
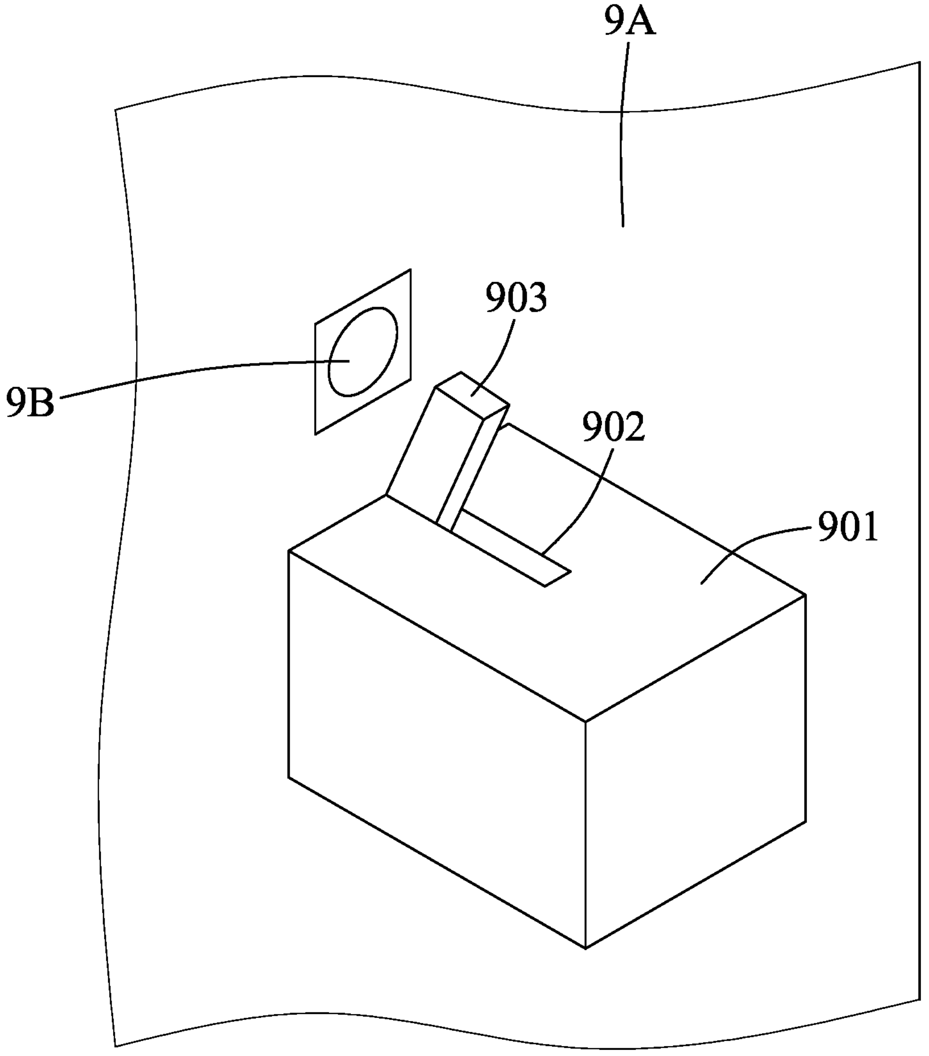
FIG.11 PRIOR ART
FIG. 11 is a perspective view illustrating another conventional switch control device that is mounted on a mounting surface and is juxtaposed to a switch button disposed on the mounting surface.

FIGS. 8 and 9 show another embodiment of the switch control device 100 of the present invention. This embodiment has a structure similar to the previous embodiment, and the differences between the two embodiments reside in the following. In this embodiment, the mounting member 2 is provided on the second mounting wall 13, and the second mounting wall 13 is attached to the mounting surface 92 via the mounting member 2 so as to mount the switch control device 100 on the mounting surface 92. In this embodiment, the push arm 7 also can rotate relative to the casing 1, without touching the casing 1, between a pushing state and a release state. When in the release state (see FIG. 8), the push arm 7 extends away from the second mounting wall 13, and beyond the first mounting wall 11. When in the pushing state (see FIG. 9), the push arm 7 extends away from the first mounting wall 11 and beyond one of the first wall parts 121 of the surrounding wall 12 and the distal end of the arm body 71 of the push arm 7 pushes the switch 91.

In yet another embodiment, the intersection of the rotary shaft 31 and the coupling end of the push arm 7 is adjacent to a corner 14 (as shown in FIG. 9) of the casing 1 where the first mounting wall 11 is connected to the surrounding wall 12. The corner 14 may be a corner where the first mounting wall 11, one of the first wall parts 121 of the surrounding wall 12, and one of the second wall parts 122 of the surrounding wall 12 are connected to each other. Such configuration allows the switch control device 100 to have a wide application.

In summary, the push arm 7 is disposed outside of the surrounding wall 12 and is capable of rotating relative to the casing 1 without touching the casing 1, so that the rotation of the push arm 7 is not limited by the casing 1, and so that the push arm 7 has a wide range of rotation. Specifically, according to the present invention, the push arm 7 is bidirectionally rotatable in a 360 degree angle when the switch control device 100 is not mounted on the mounting surface 92, so as to be capable of pushing different places on the mounting surface 92. As a result, the switch control device 100 can be mounted at various location on the mounting surface 92 in the vicinity of the switch 91 for controlling the switch 91. Therefore, for example, even if there is an obstacle at a side of the switch 91, the switch control device 100 can still be mounted on another side of the switch 91 and control the switch 91. Besides, as stated above, since the push arm 7 is capable of pushing different places on the mounting surface 92, the switch control device 100 of the present invention can be used for controlling various types of switches, including on switches where it is necessary to push toward two different directions or to push two different positions thereon for controlling on and off, such as tumbler switches and toggle switches. In addition, by virtue of the detachability of the push arm 7, for example, even if there is an obstacle around the switch 91 on the mounting surface 92 so that the casing 1 is only able to be mounted at a position only slightly away from the switch 91, by replacing the push arm 7 with another one of a suitable length or shape, it can still reach the switch 91 and allow the switch control device 100 to work.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A switch control device adapted for controlling a switch that is disposed on a mounting surface, said switch control device comprising:

a casing including a first mounting wall that is adapted to be mounted on the mounting surface, and a surrounding wall that extends transversely from a periphery of said first mounting wall;

a motor disposed in said casing, and having a rotary shaft that extends transversely through said surrounding wall;

a control unit disposed in said casing and electrically connected to said motor for controlling operation of said motor;

a push arm disposed outside of said surrounding wall and coupled to said rotary shaft of said motor such that rotation of said rotary shaft drives said push arm to rotate relative to said casing, without touching said casing, between a pushing state, where said push arm is adapted to push the switch, and a release state, where said push arm is adapted to be separated from the switch, thereby controlling the switch, said push arm including an arm body and a securing member, and said arm body being formed with first and second engaging holes that are communicated with each other and that are transverse to each other; and a coupling member including a base portion that is formed with a third engaging hole, and a protruding portion that protrudes from said base portion, that is inserted into said first engaging hole of said arm body, and that is formed with a fourth engaging hole being registered with said second engaging hole of said arm body, wherein said rotary shaft of said motor engages with said third engaging hole of said base portion of said coupling member, said securing member of said push arm being inserted into said second engaging hole and engaging with said fourth engaging hole of said protruding portion of said coupling member, thereby detachably coupling said push arm to said rotary shaft of said motor.

2. The switch control device as claimed in claim 1, wherein said push arm is bidirectionally rotatable in a 360 degree angle when said switch control device is not mounted on the mounting surface.

3. The switch control device as claimed in claim 1, wherein said casing further includes a second mounting wall opposite to said first mounting wall, said surround wall extending transversely from the periphery of said first mounting wall and connected transversely to a periphery of said second mounting wall, one of said first and second mounting walls being adapted to be mounted on the mounting surface so as to secure said casing on the mounting surface.

4. The switch control device as claimed in claim 3, wherein:

said push arm has a coupling end that is coupled to said rotary shaft of said motor, and a distal end that is opposite to said coupling end;

while in the pushing state, said distal end of said push arm is adapted to be adjacent to the mounting surface; and while in the release state, said push arm is adapted to be transverse to the mounting surface, and a distance between said distal end of said push arm and the one of said first and second mounting walls that is adapted to be mounted on the mounting surface is larger than a distance between said distal end of said push arm and the other one of said first and second mounting walls that is adapted to be mounted on the mounting surface.

5. The switch control device as claimed in claim 4, wherein, while in the release state, said push arm extends away from the one of said first and second mounting walls that is adapted to be mounted on the mounting surface and beyond the other one of said first and second mounting walls that is adapted to be mounted on the mounting surface.

6. The switch control device as claimed in claim 3, further comprising a mounting member provided on the one of said first and second mounting walls that is adapted to be mounted on the mounting surface for mounting the one of said first and second mounting walls on the mounting surface.

7. The switch control device as claimed in claim 1, wherein said control unit includes a control module that is electrically connected to said motor, and a wireless communication module that is electrically connected to said control module and that is configured to output a control signal to said control module upon receiving a wireless control signal from an external device, said control module being configured to control operation of said motor according to the control signal received from said wireless communication module.

8. The switch control device as claimed in claim 7, wherein said control unit further includes a power supply module that is electrically connected to said control module for supplying electrical power to said motor via said control module.

9. The switch control device as claimed in claim 8, wherein said control unit further includes a control switch that is electrically connected to said control module and that is operable for outputting a control signal to said control module, said control module being further configured to control operation of said motor according to the control signal received from said control switch.

10. The switch control device as claimed in claim 1, further comprising a motor mounting base that is disposed in and secured to said casing, said motor mounting base including:

a base wall that extends transversely from an inner surface of said first mounting wall; and first and second positioning walls that extend transversely from said base wall, that are parallel to each other, and that are disposed respectively at opposite sides of said motor and that abut against said motor.

11. A switch control device adapted for controlling a switch that is disposed on a mounting surface, said switch control device comprising:

a casing including:

opposite first and second mounting walls, one of said first and second mounting walls being adapted to be mounted on the mounting surface so as to secure said casing on the mounting surface, and a surrounding wall that extends transversely from said first mounting wall and that is connected transversely to said second mounting wall, said surrounding wall having two first wall parts that are opposite to each other, and two second wall parts that are arranged alternately with said first wall parts;

a motor disposed in said casing, and having a rotary shaft that extends transversely through one of said two second wall parts of said surrounding wall;

a push arm disposed outside of said surrounding wall, and having a coupling end that is coupled to said rotary shaft of said motor, and a distal end that is opposite to said coupling end, such that rotation of said rotary shaft drives said push arm to rotate relative to said casing for pushing the switch without touching said casing, a distance between one of said first wall parts and an intersection of said rotary shaft and said coupling end of said push arm being different from a distance between the other one of said first wall parts and the intersection of said rotary shaft and said coupling end of said push arm, said push arm including an arm body and a securing member, said arm body having said coupling end and said distal end, and said coupling end being formed with first and second engaging holes that are communicated with each other and that are transverse to each other; and a coupling member including a base portion that is formed with a third engaging hole, and a protruding portion that protrudes from said base portion, that is inserted into said first engaging hole of said arm body, and that is formed with a fourth engaging hole being registered with said second engaging hole of said arm body, wherein said rotary shaft of said motor engages with said third engaging hole of said base portion of said coupling member, said securing member of said push arm being inserted into said second engaging hole and engaging with said fourth engaging hole of said protruding portion of said coupling member, thereby detachably coupling said push arm to said rotary shaft of said motor.

12. A switch control device adapted for controlling a switch that is disposed on a mounting surface, said switch control device comprising:

a casing including a first mounting wall that is adapted to be mounted on the mounting surface, and a surrounding wall that extends transversely from a periphery of said first mounting wall;

a motor disposed in said casing, and having a rotary shaft that extends transversely through one of said second wall parts of said surrounding wall; and a push arm disposed outside of said surrounding wall, and having a coupling end that is coupled to said rotary shaft of said motor, and a distal end that is opposite to said coupling end, such that rotation of said rotary shaft drives said push arm to rotate relative to said casing for pushing the switch without touching said casing, an intersection of said rotary shaft and said coupling end of said push arm being adjacent to a corner of said casing where said first mounting wall is connected to said surrounding wall, said push arm including an arm body and a securing member, said arm body having said coupling end and said distal end, and said coupling end being formed with first and second engaging holes that are communicated with each other and that are transverse to each other; and a coupling member including a base portion that is formed with a third engaging hole, and a protruding portion that protrudes from said base portion, that is inserted into said first engaging hole of said arm body, and that is formed with a fourth engaging hole being registered with said second engaging hole of said arm body, and wherein said rotary shaft of said motor engages with said third engaging hole of said base portion of said coupling member, said securing member of said push arm being inserted into said second engaging hole and engaging with said fourth engaging hole of said protruding portion of said coupling member, thereby detachably coupling said push arm to said rotary shaft of said motor.

* * * * *